Inventor:
Donat Scherrer-Wirz
By Werner W. Kleeman
Attorney

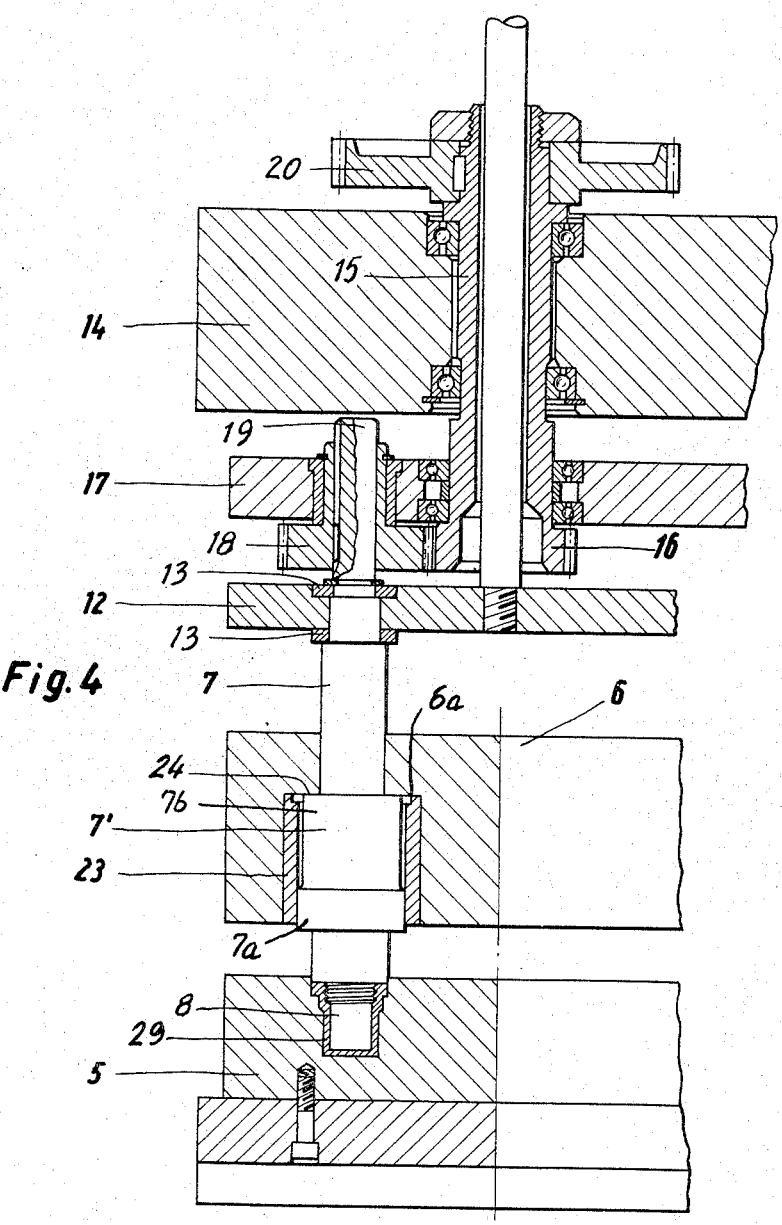

United States Patent Office 3,345,684
Patented Oct. 10, 1967

3,345,684
APPARATUS FOR FULLY AUTOMATIC
MOLDING PRESSES
Donat Scherrer-Wirz, Buch, Switzerland, assignor to
Maschinenfabrik Fahr AG., Gottmadingen, Kreis Konstanz, Germany
Filed Nov. 12, 1964, Ser. No. 410,435
Claims priority, application Germany, Nov. 18, 1963,
M 58,960
11 Claims. (Cl. 18—2)

ABSTRACT OF THE DISCLOSURE

Apparatus for the removal of plastic articles formed with internal threads from a pressing tool which comprises an ejector plate and at least one ram member that is mounted to be non-displaceable yet rotatable with respect to said ejector plate; the press ram, which carries a die, extends through a punch plate and is provided with a larger diameter section of small longitudinal extent that slides snugly in a removable sleeve of the punch plate when said press ram is moved longitudinally during a pressing operation and a smaller diameter portion which fits loosely in the sleeve when the larger diameter section is displaced completely out of the sleeve; a displaceable receiver plate provided with a number of openings, corresponding with the number of press rams, receives the pressed articles and a concave configured roller is associated with each opening and bears against the pressed article until the pressed article is unscrewed from its associated ram; slidable means, which normally, at least partially cover the openings, are arranged beneath the receiver plate; when said slide plate is moved from beneath the openings, the pressed articles are dropped.

---

The present invention has reference to an improved apparatus for fully automatic presses, particularly plastic molding presses, for the separation of pressed objects or articles provided with internal threading from the pressing tool, as well as to improved apparatus for receiving the separated pressed articles.

An unthreading or unscrewing apparatus is already known to the art, by means of which it is possible to simultaneously unscrew a larger number of pressed articles in order to increase the efficiency of the press. This known physical construction possesses unscrewing mechanisms which are displaceable relative to the press tool and engage the pressed article. The liner or casing of the unscrewing mechanisms are individually or collectively rotatable and driven by a plurality of gears arranged upon a common central bolt. If the pressed or molded articles are unscrewed from the tool by means of such type apparatus, then it is also necessary that the unscrewing mechanism is spaced or removed from the upper portion of the press in accordance with the thread pitch. This takes place by means of a number of lifting bolts mounted upon a drive spindle.

Such an unscrewing mechanism is complicated to operate because with every different thread pitch of the pressed article other lifting bolts must be mounted to the drive spindle. A further disadvantage resides in the fact that, such an unscrewing mechanism is not readily suitable for automatic operation because the individually necessary unscrewing liners and their moving parts are not sufficiently visible and are expensive.

According to another known prior art device for an automatically operable press machine having one or more simultaneously movable individual presses for hardenable plastic, there is located at the upper end of the piston guide a punch which provides a body member having external threading, in order to thereby produce pressed articles with internal threading. With this embodiment there is located a rubber roller which is supported for rotation and driven in the support housing of the automatic press, this rubber roller being mounted in a steadying or support tube. Furthermore, such rubber roller can be pressed from the outside against the circumference of the finished pressed article and unscrews such pressed article from the threading of the aforesaid punch.

Such unscrewing apparatus possesses the disadvantage, particularly with automatic presses having a large number of pressed articles in the tool, that in the narrow quarters available there is not sufficient place to provide an individual rubber roller and its drive shaft for each pressed article.

A further disadvantage resides in the fact that the pressed articles or objects are unscrew from the tool within the press frame and fall upon a chute controlled by the press piston. This chute which is controlled by the press piston, is a component of the automatic press which is readily subject to malfunction. Furthermore, burrs or flash portions of the unscrewed molded article can fall into the compartment of the press piston situated therebelow after such has already been blown-out. This leads to damaging and early wear of the press piston.

With heretofore known constructions the unscrewing apparatus is driven by an unscrewing automatic which can be pivoted-in from the side, the basic form of which must correspond to the form of the pressed article. For this purpose, for each other fabricated pressed article a new counterpiece must be finished which is insertable in the unscrewing apparatus. Moreover, with such type apparatus any members which are completely flat or smooth at the outside cannot be unscrewed without a clamping mechanism being installed at the unscrewing tool.

Thus, a primary object of the present invention is to provide an improved apparatus for separating pressed articles provided with internal threading from the press tool in a relatively simple manner, so that such apparatus is particularly suitable for fully automatic presses.

Another important object of the present invention pertains to an improved apparatus for efficiently separating in a highly reliable manner pressed articles from the pressing tool, such apparatus being relatively simple and robust in construction, economical to manufacture, and generally troublefree in operation.

Still a further important object of the present invention is to provide an improved apparatus of the type mentioned which is capable of considerably overcoming the previously indicated disadvantages of the aforesaid apparatuses of the prior art.

Yet a further important object of the present invention is concerned with an improved construction of receiver or collector device for the receipt of pressed articles after removal from the press tool.

One of the most important features of the present invention resides in the provision of a press ram which is mounted in an ejector plate so as to be non-displaceable yet rotatable, this press ram extending into a punch plate and possessing a shoulder portion which bears against the aforesaid punch plate during the pressing operation. Furthermore, a rotary drive is provided which is effective upon opening the press mold. With such an apparatus the pressed object or article is no longer unthreaded from the press ram, rather the punch seated at the press ram is threaded out of the molded article. This renders possible a simple construction of the rotary drive for a plurality of press rams. Accordingly, the rotary drive is equipped with a drive gear unit associated with a plurality of press rams.

In accordance with a preferred embodiment of the instant invention the aforementioned shoulder of the press ram is formed by a ram portion or section having a larger diameter which is only cut or ground along a part of the ram to the diameter of a guide sleeve. This renders simpler the rotational movement which providing for simultaneous guiding of the press ram. A further feature of the invention is concerned with a particular construction of the ejector mechanism.

With fully automatic presses of the type considered herein there must be strived for an efficacious construction of the receiver or collector device. For this purpose, according to the invention there is provided a receiver which can be moved into the zone of the press frame and incorporates a number of openings corresponding to the number of press rams. Moreover, with each opening there is associated a concave roller which under pressure bears against the pressed object or article seated at the extended press ram.

Other features, objects and advantages of the invention will become apparent by reference to the following detailed description and drawings in which:

FIGURE 1 schematically illustrates a longitudinal section through a press for hot-forming plastic, with the tools illustrated in closed position;

FIGURE 2 schematically illustrates a longitudinal section through the press of FIGURE 1 with the tools in open position and the receiver or collector moved into operable position;

FIGURE 3 schematically illustrates a longitudinal section through the press of FIGURE 1, with the upper press ram or die lowered in the receiver plate;

FIGURE 4 is an enlarged, fragmentary view, partly in cross-section, depicting details of the mounting of the upper press ram with a portion of the unscrewing drive;

Figure 5:
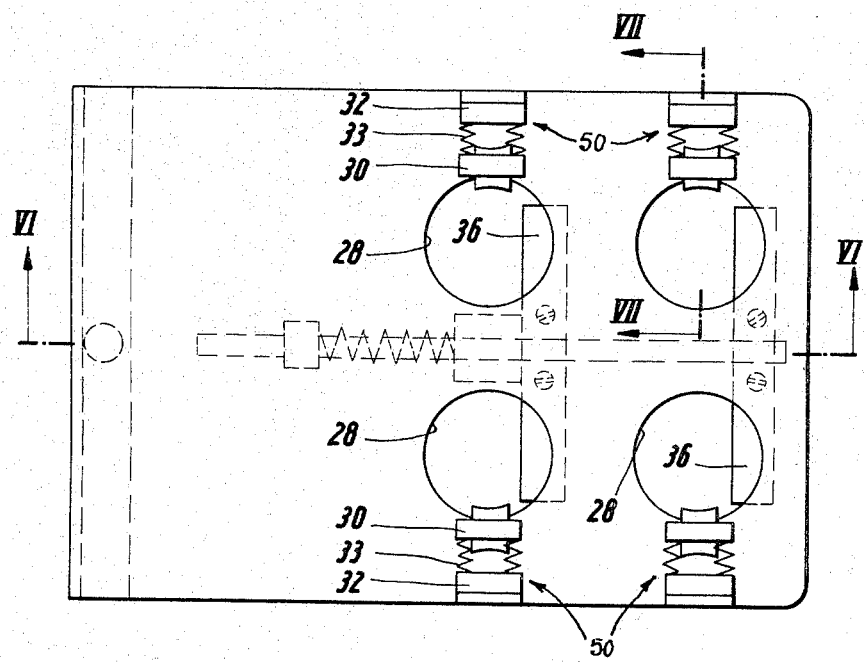
FIGURE 5 is an enlarged top plan view of the receiver.
Figure 7:
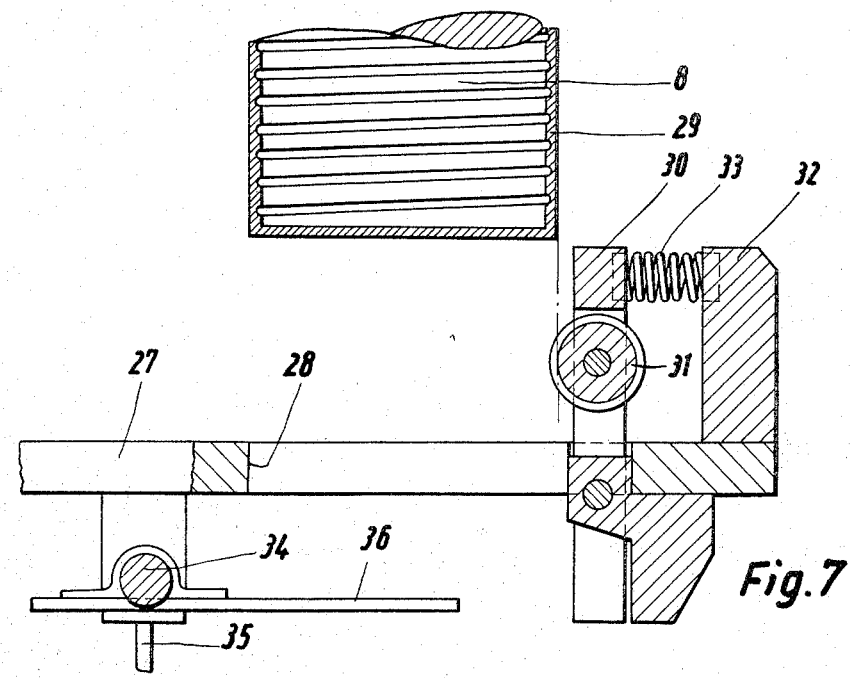
Figure 8:
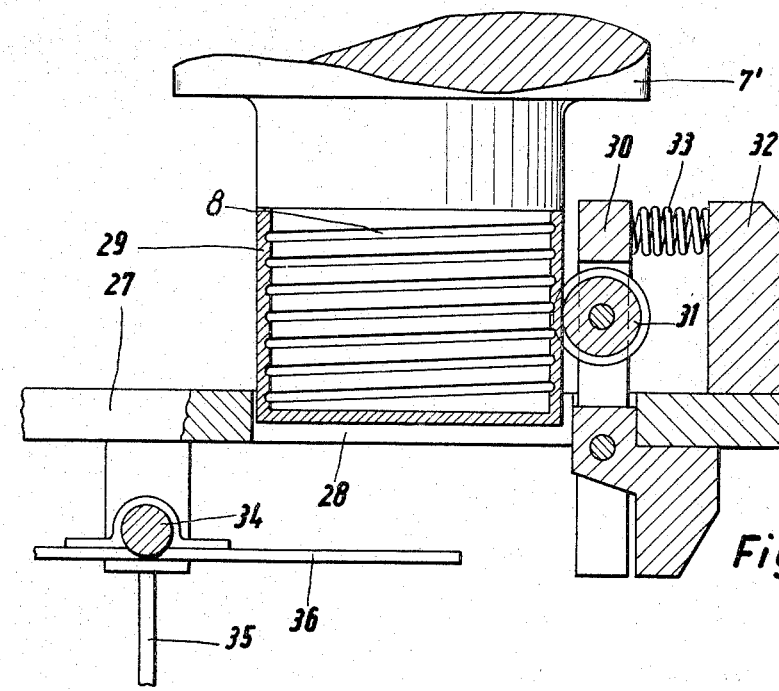

FIGURE 7 is a cross-sectional view through the spring retainer bracket or stirrup of the receiver plate of FIGURE 5, taken along the line VII—VII thereof, further depicting the punch and molded or pressed article located thereover; and FIGURE 8 is a cross-sectional view similar to FIGURE 7, in this case depicting the upper ram and punch or die in a position where the punch has moved into the receiver plate.

Figure 1:
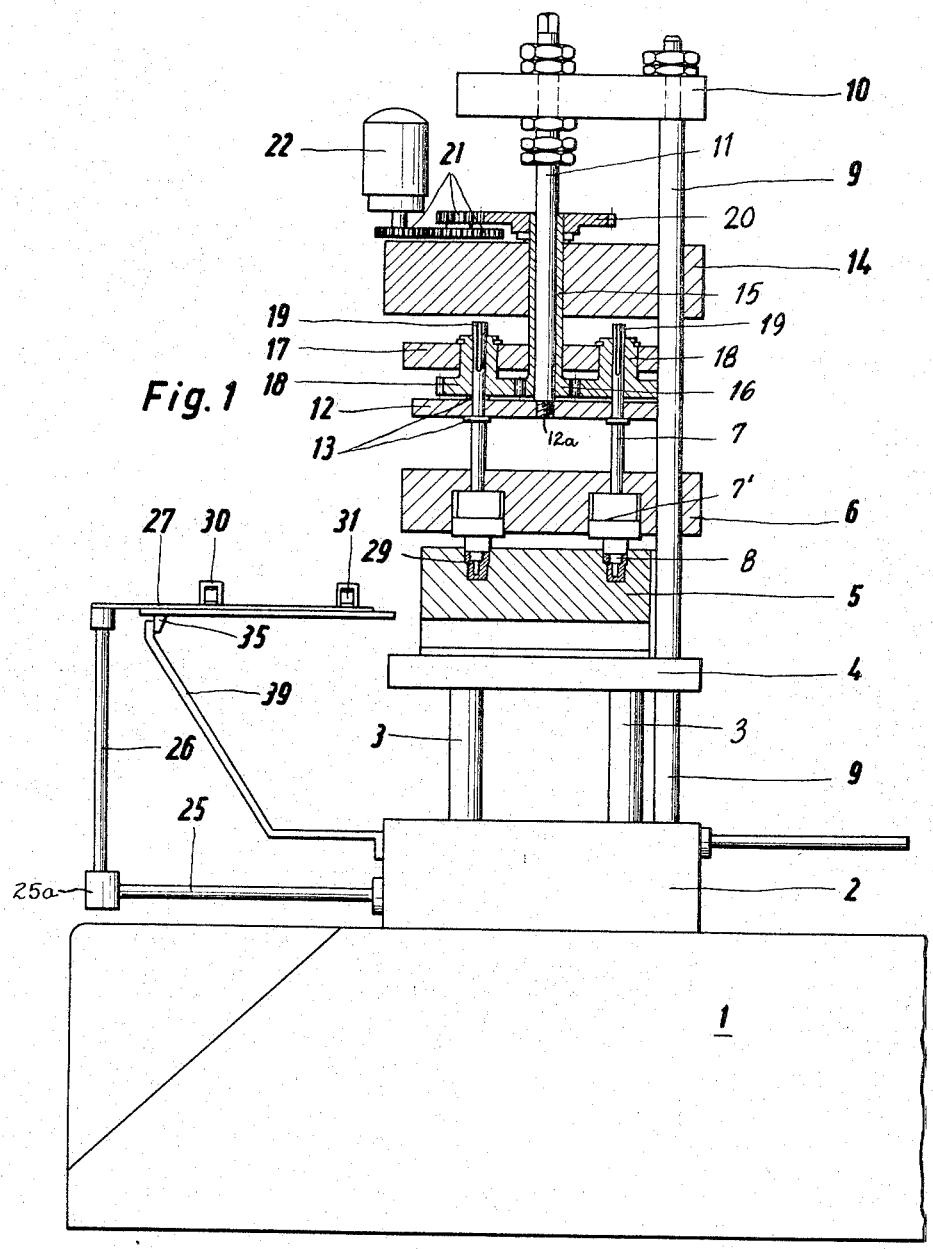

Describing now the drawings and, with attention specifically directed to FIGURE 1, it will be seen that a cylinder block 2 in which a plurality of fluid actuated, e.g., hydraulic pistons 3 are guided, is arranged upon a press frame base or support 1. These hydraulic pistons 3 support a base plate 4 at their respective upper end, upon which a lower tool portion 5 is secured. A punch plate 6 is mounted to be displaceable and fixedly adjustable at a non-illustrated portion of the press frame. A number of upper press rams 7 each incorporating a ram portion 7' piercingly extend through the punch plate 6. At the lower end of each ram section or portion 7' of such rams 7 there is located a respective punch or die 8. It will be understood that the rams 7 and ram sections or portions 7' which advantageously possess a larger diameter than the former preferably consist of a plurality of interconnected members.

A primary or main ejector piston rod 9 which is hydraulically vertically displaceable is mounted at the press frame base 1. A central ejector rod 11 is operatively connected through the agency of an ejector bridge 10 with the upper end of the primary ejector piston rod 9. An ejector plate 12 is secured at 12a to the lower end of the central ejector rod 11. The press rams 7 are mounted to be axially non-displaceable yet rotatable in the ejector plate 12 by means of nuts, adjusting rings, lock rings or equivalent elements, generally designated by reference numeral 13.

Upon a non-illustrated portion of the press frame 1, typically formed of four columns, a counterplate 14 serving as a cover is rigidly and non-displaceably connected with the aforesaid columns. A hollow spindle 15 having located thereon a pinion 16 is rotatably mounted in the counterplate 14, this hollow spindle surrounding the central ejector rod 11. The same number of spur gears 18 or the like, corresponding to the number of press rams 7, are mounted in a bushing plate 17. The splined shafts 19 of the respective press rams 7 extend so as to be axially displaceable through and with respect to the associated spur gear 18. A further spur gear 20 is wedged or otherwise fixed at the upper end of the hollow spindle or shaft 15 which meshes with a speed reduction drive 21 of a suitable drive motor 22.

The widened portion or section 7' of each press ram 7 is guided with sufficient play in a guide bushing or sleeve 23 of the punch plate 6, as best seen by referring to FIGURE 4. Only a portion, for example the lower third of the press ram section 7', designated by reference character 7a, is cut-in i.e. snugly seated in the sleeve 23, whereas the other portion 7b of the press ram section 7' exhibits a larger play or clearance with regard to the aforesaid sleeve 23. The shoulder 24 formed by the press ram section 7' and the edges of the bores 6a in the punch plate 6 take-up the pressing force during the pressing operation, so that no axial forces act upon the drive gears 16, 18, 20, 21, thus the supports or bearings for such gears can be made extremely simple.

Horizontally arranged receiver pistons 25, only one of which is visible in the drawings, are reciprocably guided in the cylinder block 2, at the external end 25a of which there is secured a receiver rod 26. A receiver or collector plate 27 is rigidly connected at the upper end of this receiver rod 26. As clearly shown in FIGURE 5, the receiver or collector plate 27 possesses a plurality of apertures or openings 28 which in their cross-sectional configuration approximately correspond to that of the pressed or molded articles 29. A respective clamp roller support 50 is located laterally of each opening 28 and comprises a spring retaining bracket or stirrup 30, a concave configured pressure roller 31, a spring holder 32 and a number of pressure springs 33.

A push or slider rod 34 to which there is connected a stop or impact member 35 is slidably disposed beneath the receiver plate 27. Additionally, slides 36 are connected with the push or slide rod 34, which in their normal position extend somewhat beneath the associated openings 28. A pressure spring 38 is located between a bearing block 37 of the receiver plate 27 and the stop member 35, such spring always pulls the push rod 34 and its slides 36 into a position in which the openings 28 are partially closed by the aforesaid associated slides 36.

Furthermore, an impact or abutment arm 39 is mounted to the press frame base or support 1, or to the cylinder block 2, or to the non-illustrated portion of the press frame. This impact arm 39 fulfills the function of holding back the stop member 35 and the therewith connected push or slide rod 34 upon outward displacement of the receiver plate 27 (i.e. to the left in FIGURE 1), whereby the openings 28 are freed and the unthreaded pressed articles or objects 29 fall-out of the press through the corresponding openings 28.

The mode of operation of the described apparatus designed according to the teachings of the present invention is as follows: It is assumed that the illustrated press is of the type which, in known manner, works hydraulically and its pistons and hydraulic controlled components cooperate with contacts which switch-in and switch-out the automatic sequence of working steps.

After charging the tool portion or mold 5 with the required pressing or molding material by means of a suitable material feeder (not shown), the hydraulic pistons 3 together with the spaced base plate 4 move upwardly and press or mold the pressed articles 29. The fully automatic press has now assumed the position depicted in FIGURE 1. After the required hardening time for the pressed articles 29 has expired the base plate 4 together with the lower tool portion 5 moves downwardly, the press thus opens. When the base plate 4 has reached its lowermost position then a suitable non-illustrated contact switches-in the receiver piston 25, which thereafter together with the receiver rod 26, assumes the position depicted in FIGURE 2. A further contact now switches-in the ejector unit, whereby the main ejector rod 9 and with such, the ejector bridge 10, the upper central ejector rod 11, the ejector plate 12 and the press rams 7 move downwardly until they have reached the position shown in FIGURE 3. In so doing, the press rams 7 are displaced downwardly in the splined sections 19a of the associated spur gears 18. During this operation each pressed article or object 29, as clearly seen in FIGURES 7 and 8, has moved into its associated opening 28 provided at the receiver plate 27 and, thus, presses at one of its sides against the associated concave pressure roller 31. It will be understood that the pressure of the spring 33 against the spring holder stirrup 30 and, therewith also against the pressure roller 31, is so strong that the pressed article 29 is securely held by the aforesaid roller.

Now, a further contact switches-in the drive motor 22 so that the press rams 7 rotate in the unscrewing direction for the pressed article 29 via the drive means 16, 18, 20, 21, yet in so doing do not experience any axial displacement. Since, only approximately the lower third of the press ram section 7' has been ground-in i.e. seated in the sleeve 23 (FIGURE 4), and this portion 7a has moved downwardly out of the aforesaid sleeve, the press rams 7 can be placed in rotation by the drive arrangement 16, 18, 20, 21, 22, without the press ram section 7' experiencing a frictional rubbing in its sleeve 23 which would retard rotational movement.

During this rotational movement of the punch 8 the pressed or molded article 29 is rigidly held in place by the associated pressure roller 31 (FIGURE 8). In so doing, the pressed article 29 is downwardly displaced in accordance with the thread pitch until the punch 8 is completely screwed-off. Then, the pressed article 29 falls through the associated opening 28 onto the slider member 36 positioned therebelow. Now, the primary ejector rod 9 and therewith also the press rams 7 are raised.

Figure 2:
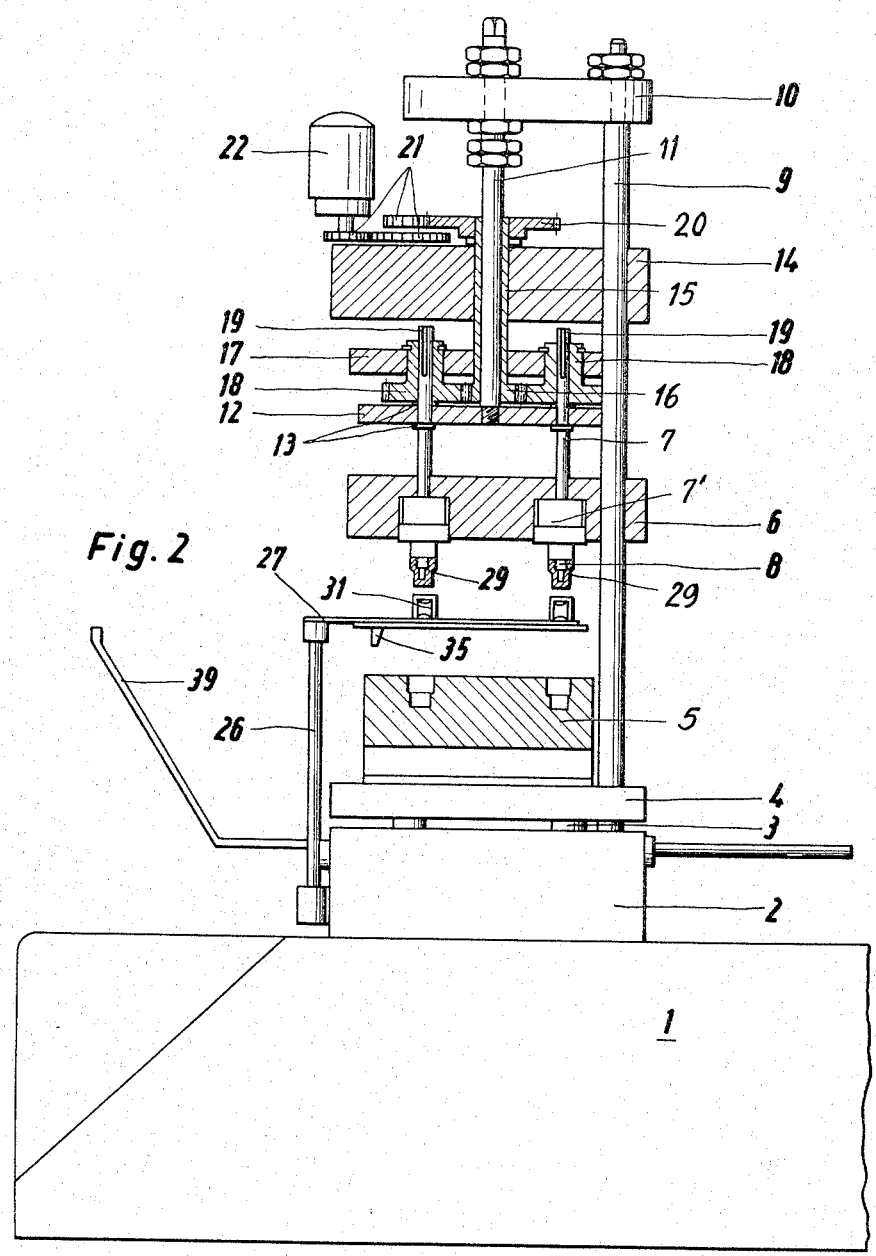
Figure 3:
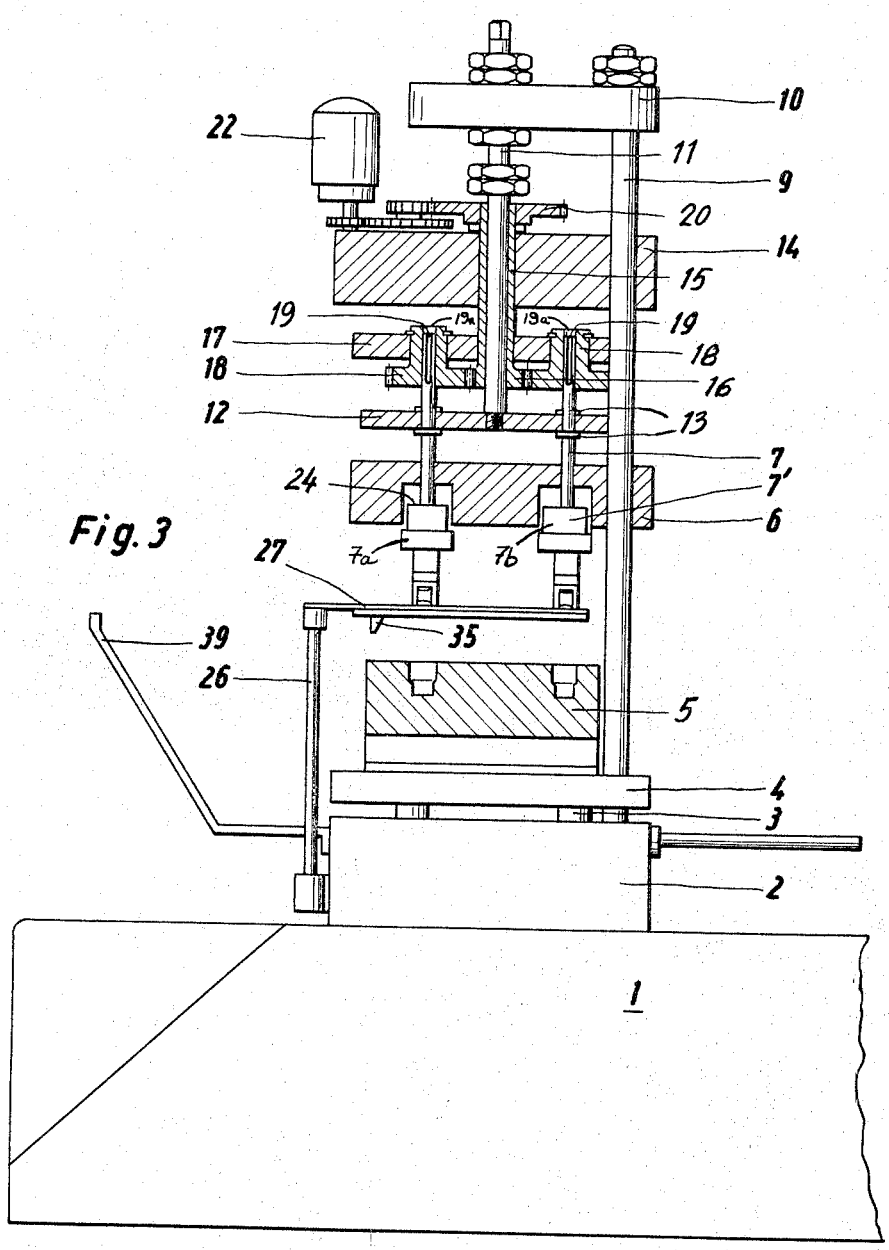
Figure 6:
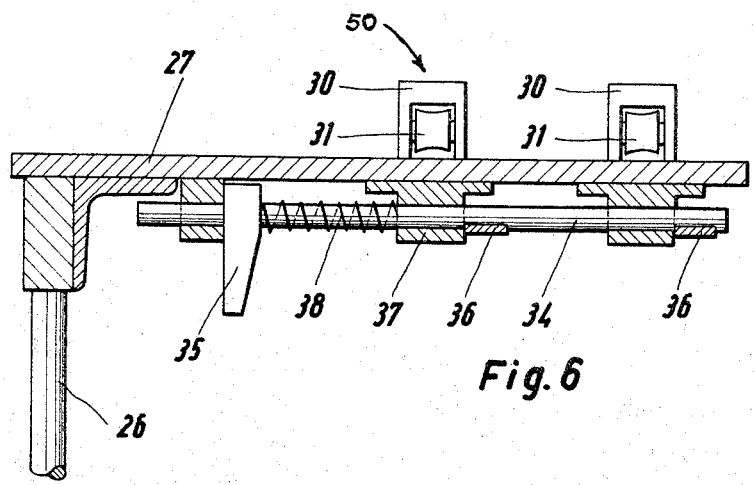
FIGURE 6 is a cross-sectional view of the receiver of FIGURE 5, taken along the line VI—VI thereof.

The receiver or collector plate 27 is now moved to the outside i.e. to the position shown in FIGURE 2. In so doing, the stop member 35 engages with the stop or impact arm 39, so that the push rod 34 together with the sliders 36 remain stationary relative to the receiver plate 27, and this receiver plate 27 with the openings 28 is thus moved out of the effective region of the sliders 36. Consequently, the pressed articles or objects 29 can now fall through the associated openings 28 into a suitable storage container (not shown) which, in the meantime, has been placed into position.

According to the inventive apparatus a large number of pressed articles provided with internal threading can be released at one time from the punches 8 by the provided drive arrangement. In so doing, the drive arrangement for unscrewing the punches 8 from the pressed articles 29 can be accommodated in the press in the most simple manner, because the necessary counterpressures are not furnished by the drive, rather by the punch plate 6 and transmitted to the associated shoulder 24 of the respective press rams 7.

While there is shown and described a present preferred embodiment of the invention it is to be distinctly understood that the invention is not limited thereto but may be otherwise variously embodied and practised within the scope of the following claims.

What is claimed is:
1. Apparatus for fully automatic presses, particularly plastic molding presses, for separating a pressed article provided with internal threading from a pressing tool, comprising an ejector plate, at least one press ram mounted to be non-displaceable yet rotatable at said ejector plate, a punch plate through which said press ram piercingly extends, said press ram including shoulder means bearing against said punch plate during the pressing operation, rotary drive means for driving said press ram when the press is opened, said apparatus including a hollow guide sleeve of given diameter carried by said punch plate, said press ram being provided with a larger diameter ram section slidable within said hollow guide sleeve, means to move said press ram longitudinally of said hollow guide sleeve, only a small portion of said larger diameter ram section substantially corresponding in diameter to said given diameter of said hollow guide sleeve, whereby the aforesaid small portion of said ram section slidably contacts the internal walls of said hollow sleeve during a pressing operation, the longitudinal extent of said small portion of said ram section being of a length such that when said press ram is moved longitudinally of the hollow sleeve, said small portion is displaced completely out of engagement with said sleeve.

2. Apparatus as defined in claim 1 wherein said press ram incorporating said larger diameter ram section is formed of a plurality of interconnected members.

3. Apparatus as defined in claim 1 further including a plurality of press rams, said rotary drive means incorporating a system of gears cooperating with said plurality of press rams, central ejector rod means for carrying said ejector plate, a rotatably mounted hollow spindle surrounding said central ejector rod means for transmitting the driving power of said rotary drive means.

4. Apparatus for fully automatic presses, particularly plastic molding presses, for separating a pressed article provided with internal threading from a pressing tool, comprising an ejector plate, at least one press ram mounted to be non-displaceable yet rotatable at said ejector plate, a punch plate through which siad press ram piercingly extends, said press ram including shoulder means bearing against said punch plate during the pressing operation, rotary drive means for driving said press ram when the press is opened, displaceable receiver means incorporating a displaceable receiver plate for receiving the pressed articles cooperating with the pressing tool, said displaceable receiver plate being provided with a number of openings corresponding to the number of press rams, a concave configured roller provided for each opening bearing under pressure against the pressed article seated upon the associated press ram when the latter is in extended position.

5. Apparatus as defined in claim 4 further including a spring retaining bracket in which said concave roller is mounted, spring means for holding said spring retaining bracket in its working position.

6. Apparatus as defined in claim 4 wherein slide means are arranged beneath said receiver plate for at least partially normally covering the openings thereof, and for completely uncovering said openings when the pressed articles are to be dropped through their associated opening.

7. Apparatus as defined in claim 6 including a slide rod upon which said slide means are seated, a stop member provided for said slide rod, and a stationary impact member with which said stop member cooperates.

8. Apparatus for fully automatic presses, particularly plastic molding presses, for separating a pressed article provided with internal threading from a pressing tool, said press having at least one press ram, comprising displaceable receiver means including a displaceable receiver plate for receiving the pressed articles, said displaceable receiver plate being provided with as many openings as there are press rams, each opening being adapted to receive a pressed article, a concave configured roller provided for each opening bearing under pressure against the pressed article when the latter is moved into its associated opening.

9. Apparatus as defined in claim 8 further including a spring retaining bracket in which said concave roller is mounted, spring means for holding said spring retaining bracket in its working position.

10. Apparatus as defined in claim 8 wherein slide means are arranged beneath said receiver plate for at least partially normally covering the openings thereof, and for completely uncovering said openings when the pressed articles are to be dropped through their associated opening.

11. Apparatus as defined in claim 10 including a slide rod upon which said slide means are seated, a stop member provided for said slide rod, and a stationary impact member with which said stop member cooperates.

References Cited
UNITED STATES PATENTS

| | | | |
|---|---|---|---|
| 2,155,316 | 4/1939 | Lauterback. | |
| 2,295,220 | 9/1942 | Kaula. | |
| 2,514,486 | 7/1950 | Green | 18—2 X |
| 2,799,049 | 7/1957 | Wilson | 18—2 X |
| 2,984,862 | 5/1961 | Chabotte | 18—2 |
| 2,992,577 | 7/1961 | Marxen | 18—2 X |

J. SPENCER OVERHOLSER, *Primary Examiner.*

J. HOWARD FLINT, JR., *Examiner.*